United States Patent
Zhang et al.

(10) Patent No.: US 7,386,189 B2
(45) Date of Patent: Jun. 10, 2008

(54) SCANNING DEVICE WITH A POSITIONING SENSOR AND A CORRESPONDING PROCESSING METHOD TO OBTAIN IMAGES

(75) Inventors: Wei Zhang, Hong Kong (CN); Fu Zhang, Shenzhen (CN); Zhiguo Chang, Shenzhen (CN); Yingfeng Lv, Shenzhen (CN); Chengwu Gu, Shenzhen (CN); Xiaoyun Ding, Shenzhen (CN)

(73) Assignee: Shenzhen Syscan Technology Co. Ltd., Shenzhen, P.R. (CN)

( * ) Notice: Subject to any disclaimer, the term of this patent is extended or adjusted under 35 U.S.C. 154(b) by 592 days.

(21) Appl. No.: 10/980,518

(22) Filed: Nov. 3, 2004

(65) Prior Publication Data

US 2005/0094902 A1 May 5, 2005

(30) Foreign Application Priority Data

Nov. 4, 2003 (CN) ...................... 2003 1 01120638

(51) Int. Cl.
*G06K 9/32* (2006.01)
*G06K 9/20* (2006.01)
*G06K 7/00* (2006.01)

(52) U.S. Cl. ...................... 382/293; 382/312
(58) Field of Classification Search ................ 382/293, 382/312, 317, 295; 358/1.2, 1.5, 505, 514, 358/477, 474, 488
See application file for complete search history.

(56) References Cited

U.S. PATENT DOCUMENTS

| | | | | |
|---|---|---|---|---|
| 5,355,146 A | * | 10/1994 | Chiu et al. ................... | 345/156 |
| 6,249,360 B1 | * | 6/2001 | Pollard et al. ............. | 358/473 |
| 6,330,082 B1 | * | 12/2001 | Oliver ........................ | 358/473 |
| 6,403,941 B1 | * | 6/2002 | Crane ....................... | 250/208.1 |
| 2002/0080340 A1 | * | 6/2002 | Kessler ........................ | 355/77 |

* cited by examiner

*Primary Examiner*—Yon J. Couso
(74) *Attorney, Agent, or Firm*—Knobbe Martens Olson & Bear LLP

(57) ABSTRACT

The present invention relates to a scanning device with a positioning senor and a processing method to obtain images, comprising a casing, linear contact image sensor (CIS), further comprising a system processor P3 for controlling the work of said CIS by timing signal, the optical coordinate sensors and the displacement processor P1 and P2 for estimating the coordinate increment (8001) and the coordinate increment (8002) of the real-time displacement, an A/D circuit and data buffer; said system processor P3 packets original scanning data with positioning information (8004), and then transfers to the upper machine. An image processing module in the upper machine de-packets said original scanning date (8004); Converts out the coordinate of the terminal pixel of said linear contact image sensor (CIS), and configures the image line in the object image configuring area; and calculates and rectifies the relative offset of the positioning coordinate of the two scanning bands making using of the statistical characteristic of part of pixel data in the overlapped area of the two scanning bands.

19 Claims, 15 Drawing Sheets

510 520

SCANNING DEVICE WITH A POSITIONING SENSOR AND A CORRESPONDING PROCESSING METHOD TO OBTAIN IMAGES

FIELD OF THE INVENTION

The present invention relates to an optical scanning technology, particularly to a scanning device with a positioning senor and a corresponding processing method to obtain images.

BACKGROUND OF THE INVENTION

The traditional scanners are plate scanners. The images to be scanned are placed at the scanning window of the scanners, behind which the image sensor moves to acquire data of the scanned images. Such structure has large volume and is of heavy weight. Afterwards, the paper-feeding scanners came into existence, the media of the images to be scanned are driven to move across the scanning window of strip shape, and then the image sensor acquires data of the image to be scanned. Although such structure has decreased volume and weight, but it is inconvenient to scan all images of a whole book. As a result, the handhold scanning brush and scanning pen of smaller volume came into being. Users move such scanners by hand across the media to be scanned and then the images to be scanned can be read. But the scanning window of the scanning pen is so small that such scanner is just used to scan images of a-word area. Even though the scanning brush has a larger scanning window compared with the scanning pen, in order to ensure successfully revert scanning-obtained data, users are requested to move the scanner straight, so such scanner are generally equipped with a scanning guide which increases weight of the handhold scanning brush, meanwhile the scanning area is restricted by the scanning window's area.

SUMMARY OF THE INVENTION

The object of the present invention is to provide a scanning device with a positioning sensor, whose scanning area is not restricted by the scanning window's area, and which may move across the scanned images in a zigzag manner, and a corresponding processing method to acquire images.

A scanning device with a positioning sensor, which may be connected to an upper machine, comprises a casing, a linear contact image sensor (CIS), further comprises a system processor P3 for controlling the work of said CIS by timing signal, the first optical coordinate sensor and the first displacement processor P1 for estimating the first coordinate increment (8001) the real-time displacement of said scanning device, the second optical coordinate sensor and the second displacement processor P2 for estimating the second coordinate increment (8002) of the real-time displacement of said scanning device, an A/D circuit connected to the signal output of said CIS, a data buffer for storing the first and second coordinate increment and digital image data outputted by corresponding A/D circuit; said system processor P3 packets said first and second displacement coordinate increments (8001, 8002) stored in said data buffer and digital image scanning data (8003) outputted through said A/D circuit by said linear contact image sensor (CIS) into original scanning data with positioning information (8004), and then transfers to the upper machine.

A processing method for a scanning device with a positioning sensor to obtain images, includes the following steps, A) the first optical coordinate sensor and the first displacement processor P1 estimate out the first real-time displacement coordinate increment (8001), and the second optical coordinate sensor and the second displacement processor P2 estimate out the second real-time displacement coordinate increment (8002). Said system processor P3 packets said first and second displacement coordinate increments (8001, 8002) and digital image scanning data (8003) outputted through said A/D circuit by said linear contact image sensor (CIS) into original scanning data with positioning information (8004), and then transfers them to the upper machine. B) An image processing module in the upper machine de-packets said original scanning date (8004). C) Said image processing module converts out the coordinates of the terminal pixel of said linear contact image sensor (CIS), and configures image lines in the object image configuring area making use of the coordinates of the terminal pixel. D) Said image processing module calculates the relative offset of the positioning coordinate of the second scanning band making using of the statistical characteristic of part of pixel data in the overlapped area of the second scanning band, and rectifies the relative offset and configures image lines.

Since a scanning device with a positioning sensor disclosed by the present invention uses two optical coordinate sensors to obtain the displacement coordinate increments in the scanning process, and uses such displacement coordinate increments to process the image data, in order that the scanning area is not restricted by the scanning window's area; meanwhile such device may also serve as a handy mouse with simple structure and low cost. The present invention uses the displacement coordinate increments to trigger to sample the line scanning information and fix the time of exposure, which is adjusted to change of the speed at which the users move the scanning device across the media and decrease data transmission and get equal level of image brightness. As the structure of the scanning device provided by the present invention is designed to be of a strip shape, the scanning device is more suitable for media to be scanned with uneven surfaces. For an example, when scanning an opened book, it is possible to sample the images close to the spine correctly. In the image processing method provided by the present invention, it is possible to configure images when receiving data, which improves parallel degree of computing, sufficiently takes advantage of the time-sharing operating system and shortens post-processing time; it is also possible to configure images after scanning, before which computes how big the object image is and integral gradient in order to allocate sufficient resources for configuring images by one time and decrease complexity of the software.

BRIEF DESCRIPTION OF THE DRAWINGS

The present invention includes the following drawings.

DETAILED DESCRIPTION

Figure 1:
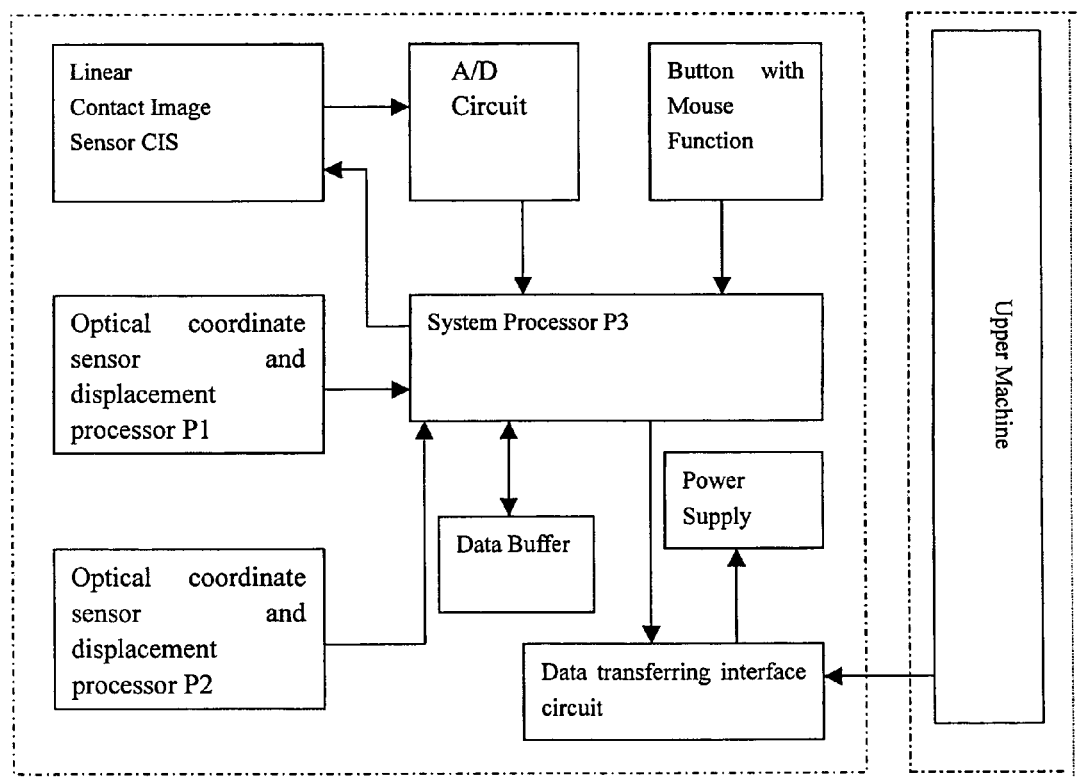
FIG. 1 illustrates the circuit structure of the present invention in accordance with one embodiment of the present invention.

FIG. 1 illustrates a circuit structure of the present invention, wherein includes a system processor P3, optical coordinate sensor and displacement processor P2, linear contact image sensor (CIS), A/D circuit, button with mouse function, power supply circuit, data buffer and data transferring interface circuit; and is connected to an upper machine via the data transferring interface circuit. The first optical coordinate sensor and the first displacement processor P1 estimate out the first coordinate increment (8001), and the second optical coordinate sensor and the second displacement processor P2 estimate out the second coordinate increment (8002). The coordinate increment (8001) and the coordinate increment (8002) are then transferred to the system processor P3; the system processor P3 controls the linear contact image sensor (CIS) through ON-OFF signal and timing signal from mouse-functional buttons to acquire analog image scanning data and then transfer them to the A/D circuit. The A/D circuit outputs digital image scanning data 8003 to the system processor P3. The system processor P3 uses the data buffer to packet the real-time displacement coordinate increments 8001, 8002 and the digital image scanning data 8003 into the original scanning data with positioning information 8004, and then transfers them via the data transferring interface circuit to the upper machine.

The power supply circuit supplies power offered by the upper machine to all parts of the circuit via the data transferring interface circuit.

As shown in the circuit structure of FIG. 1, the present invention separates the scanning device from image-correct analyzing process, the system processor P3 at device end packets the displacement vectors outputted by P1, P2 and a line of image data sampled by the CIS via a communicate interface and transfers them to the upper machine. The original scanning data 8004 are processed in the upper machine. The upper machine may be a PC, or PDA or mobile phone with a universal data-transferring interface. The scanning device doesn't require an separate power supply that is offered by the upper machine.

The system processor P3 also processes the P1 and P2's displacement vector information, based on which the P3 controls and starts the contact-type linear contact image sensor (CIS) to scan by line; in other words, when the scanning device of the present invention is moved, the optical sensor and the displacement processor P1, P2 output the real-time displacement coordinate increments 8001, 8002; And when the linear contact image sensor (CIS) obtains line start signal SP, sample a line of image data.

In the non-scanning mode, the scanning device of the present invention may serve as a mouse.

Figure 2:
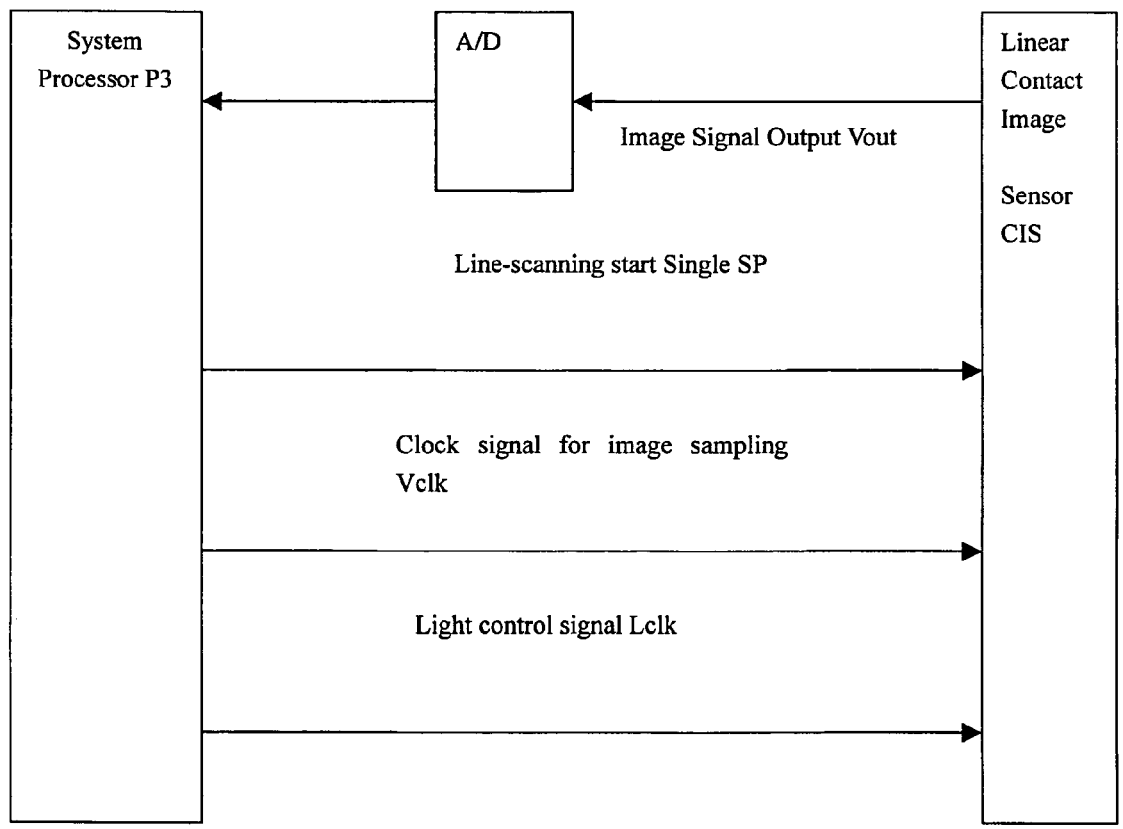
FIG. 2 is a schematic diagram illustrating control single of a system processor P3 to a linear contact image sensor (CIS) in accordance with one embodiment of the present invention.

FIG. 2 illustrates the control signal of the system processor P3 to the linear contact image sensor (CIS). When the scanning device of the present invention is in the scanning mode, the system processor P3 is triggered by the optical coordinate sensor and the displacement processor P1, P2 to start line scanning start signal SP, which is transferred together with clock signal for image sampling Vclk and light control signal Lclk to the linear contact image sensor (CIS) to control the data sampling. The time when the light in the CIS samples each line of the analog image scanning information is fixed as the shortest time of exposure. As the brightness of such light is strong enough, compared with the natural light transmitting through the device and irradiating the scanned media surface, the different moving speed and unfixed line starting signal frequency will not result in difference in the quantity of illumination of different line. Compared with the mode to sample line image at fixed frequency, such mode will greatly reduce the quantity of transferring data.

Figure 3:
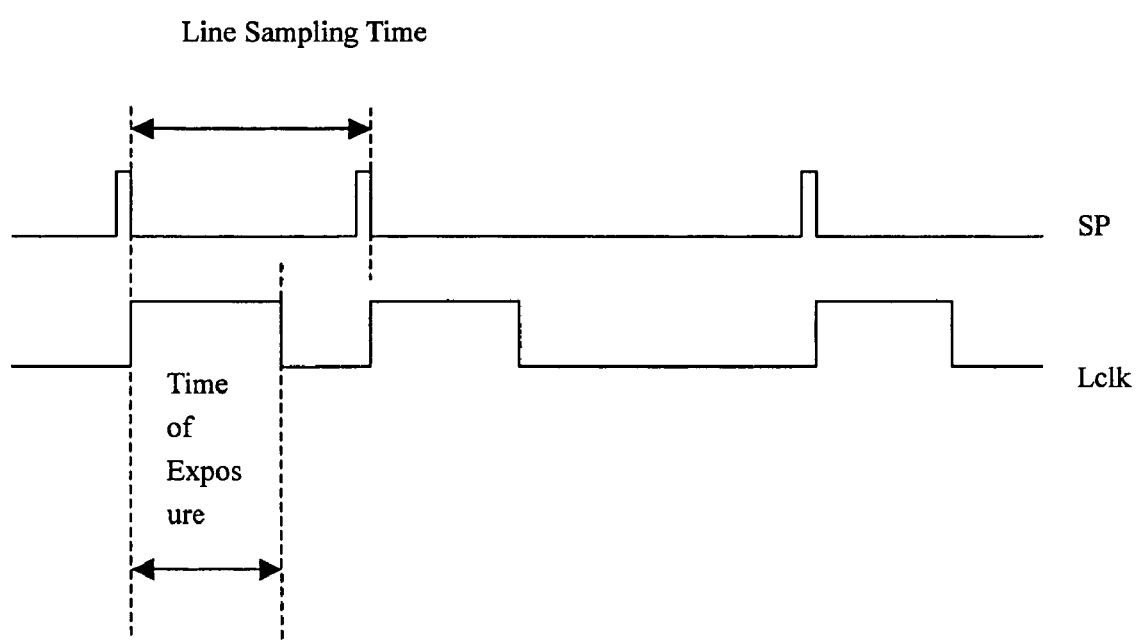
FIG. 3 illustrates timing signal of the linear contact image sensor (CIS)

FIG. 3 illustrates the timing signal of the linear contact image sensor (CIS). Since the line scanning start signal SP is at random triggered, line sampling time is different but the time of exposure is fixed, guaranteeing the same prime brightness of each line.

When the scanning device is applied to connect a PDA or mobile phone, it is possible not to adopt the separate mode in order to decrease the cost and volume of the device. In the mode that the scanning device is integrated with the PDA or mobile phone, it is possible to replace the system processor P3 in the original device by a main processor in the PDA or mobile phone to sample displacement information of the P1, P2 and control the CIS.

A line of original scanning data with positioning information 8004 includes the real-time displacement coordinate increments 8001, 8002 and a line of scanning pixel value. The number of scanning pixel is dependent upon the size and resolution of the linear contact image sensor (CIS), while the scanning pixel value is decided by the scanned image's reflective ability to the CIS light. Since each scanning pixel's position is relatively fixed and the CIS moves attached to the image to be scanned in the scanning process, each line of original scanning data 8004 may be positioned on condition that the coordinate of the terminal pixel is computed according to the real-time displacement coordinate increments 8001, 8002.

Figure 4:
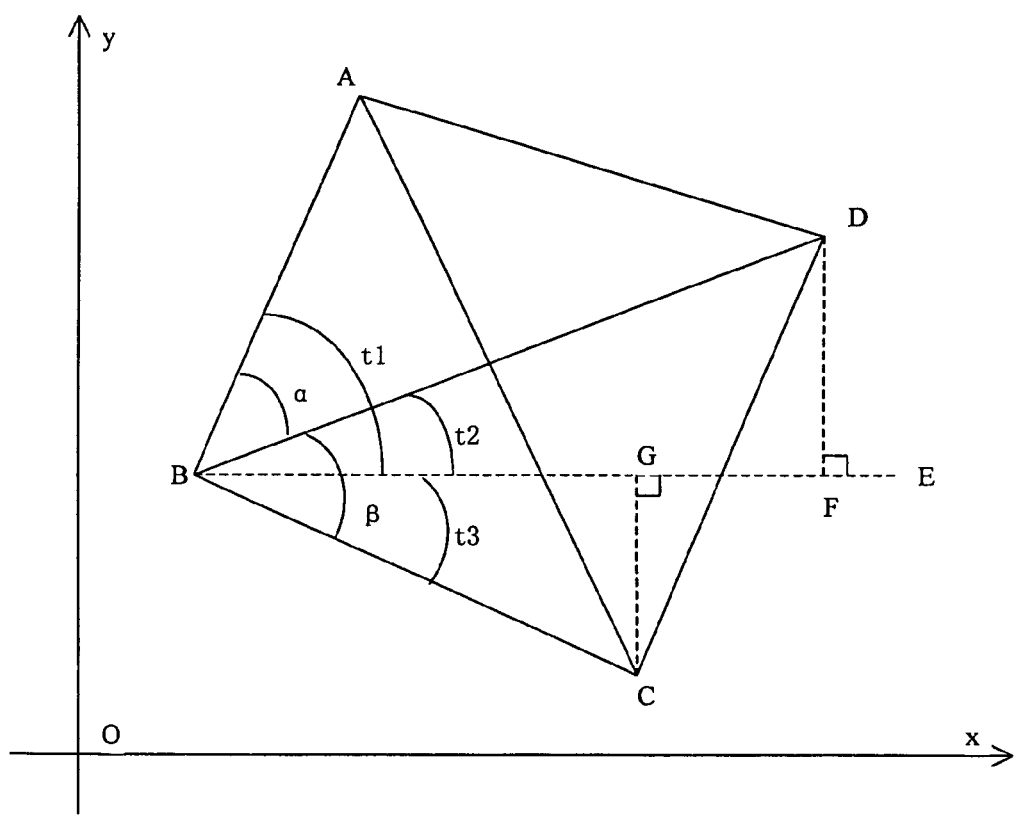
FIG. 4 is a schematic diagram illustrating the coordinate relation between a coordinate sensor and a linear contact image sensor (CIS)
Figure 5:
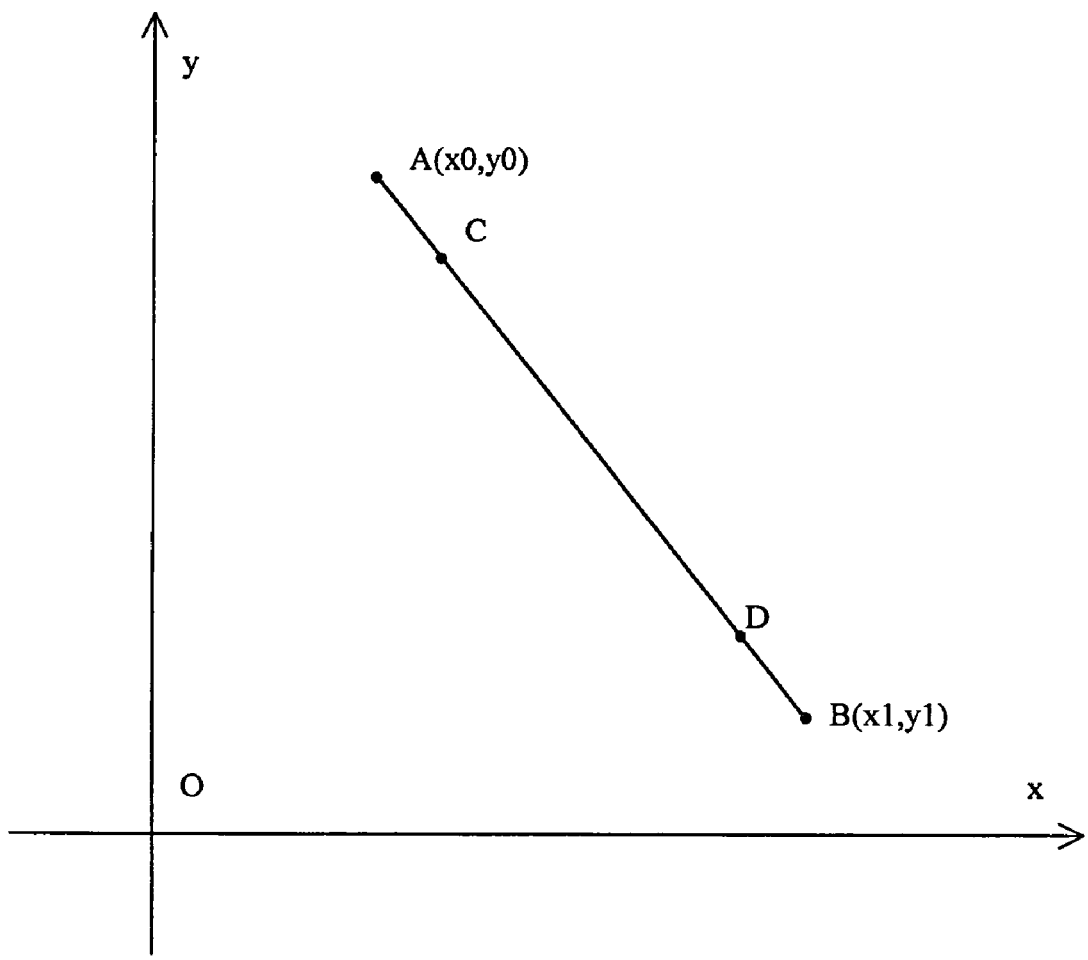
FIG. 5 is a schematic diagram illustrating the coordinate relation between a coordinate sensor and a linear contact image sensor (CIS) when the two are in a line.

FIG. 4 illustrates the coordinate relation between the coordinate sensor and the linear contact image sensor (CIS). Suppose two centers of the coordinate sensor are A and B, two terminals of the CIS are C and D. The distance between the four points is relatively fixed, i.e., the distance between either two points of A, B, C and D is fixed, thus interior angels of the quadrilateral are fixed too. When given point A and point B's coordinate increment 8001, 8002, it is possible to compute point C and point D's coordinate by simple geometric operation. As shown in FIG. 4, suppose point A's coordinate is (x0, y0), point B's coordinate is (x1, y1), BE is a straight line parallel to axis X, and draw two straight lines parallel to axis Y through point C, D respectively intersecting the line BE at G, F; computing steps are as follows:

$t1 = a\tan((x0-x1)/(y0-y1))$; ($t1$ is $\angle ABE$)

$t2 = t1 - \alpha$; ($\alpha$ is $\angle ABD$, a constant; $t2$ is $\angle DBE$)

$|BF| = |BD| * \cos(t2)$ $|DF| = |BD| * \sin(t2)$

As a result, point D's coordinate is (x1+|BF|, y1+|DF|)

$t3 = \beta - t2$; ($\beta$ is $\angle DBC$, a constant, $t3$ is $\angle EBC$)

$|BG| = |BC| * \cos(t3)$ $|CG| = |BC| * \sin(t3)$

As a result, point C's coordinate is (x1+|BG|, y1-|CG|)

If points A, B, C, D are in a line, point C's coordinate is represented as:

$(x0+(x1-x0)*(|AC|/|AB|), y0+(y1-y0)*(|AC|/|AB|))$

Point D's coordinate is represented as:

$(x1+(x0-x1)*(|BD|/|AB|), y1+(y0-y1)*(|BD|/|AB|))$

Figure 6:
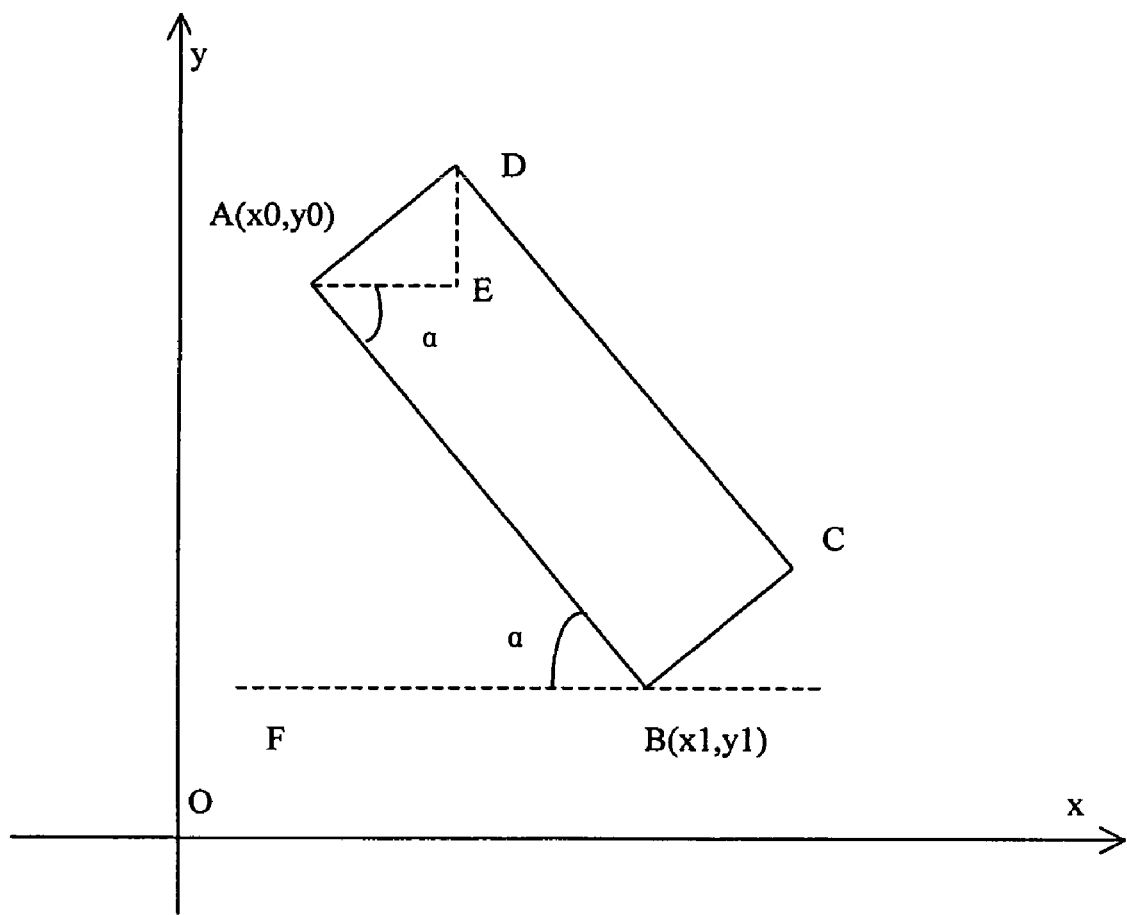
FIG. 6 is a schematic diagram illustrating the coordinate relation between a coordinate sensor and a linear contact image sensor (CIS) when the two form a rectangle.

If points A, B, C, D forms a rectangle, the length of the device can be reduced as shown in FIG. 6. Point C and D's coordinates may be determined from point A and B's coordinates as follows:

$\alpha = a\tan((x1-x0)/(y1-y0))$ $|AE| = |AD| * \sin(\alpha)$ $|DE| = |AD| * \cos(\alpha)$ Point C's coordinate is [(x0+|AE|), (y0+|DE|)]
Point D's coordinate is [(x1+|AE|), (y1+|DE|)]

Figure 7:
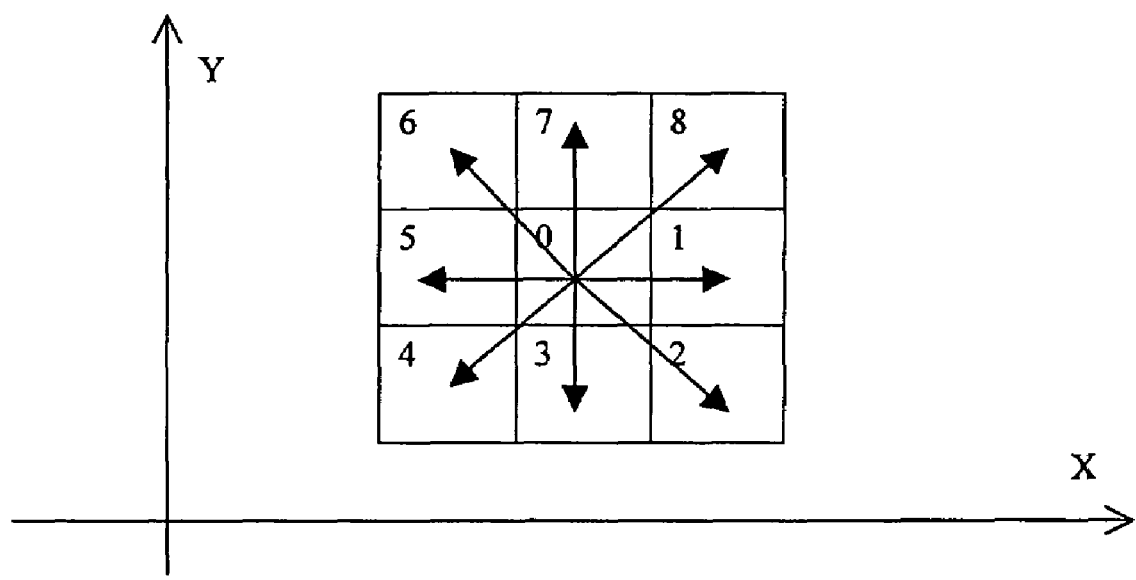
FIG. 7 is a schematic diagram illustrating the meanings of the real-time displacement coordinate increment in accordance with one embodiment of the present invention.

When the coordinate sensor moves relatively with the scanned media, the optical coordinate sensor and the displacement processor P1, P2 send out a serial of real-time displacement coordinate increments 8001, 8002 in binary semaphore (dx, dy), which indicates variation of the coordinates. The quicker the relative displacement's velocity is, the higher the signal's frequency is. Every said non-zero displacement coordinate increment 8001, 8002 triggers to generate said digital image scanning data 8003. Since the coordinate increments have integral values, the binary semaphore (dx, dy) exists in 8 forms as shown in FIG. 7 when a coordinate changes into another coordinate. Suppose current coordinate is 0 (0, 0), the relation between the binary semaphore (dx, dy) and variation of the shown in following table:

| Semaphore | | |
|---|---|---|
| dx | dy | Positions of new coordinates |
| 0 | 1 | 7 |
| 0 | −1 | 3 |
| 1 | 0 | 1 |
| 1 | 1 | 8 |
| 1 | −1 | 2 |
| −1 | 0 | 5 |
| −1 | 1 | 6 |
| −1 | −1 | 4 |

When scanning is started, as long as either of two coordinate sensors has semaphore output, the CIS will be triggered to scan one line of images. Meanwhile the system processor P3 respectively adds the coordinate increments outputted by the two sensors, and then records the track that the coordinate sensors move relatively with the media, i.e. indirectly records terminal pixels' coordinates of an image line.

It is necessary to configure the original scanning data with positioning information 8004 to restore the scanned images. When scanning is started, the scanning device of the present invention sends out a signal to the upper machine, which informs the driving software of the upper machine to shut off the mouse function and to start to receive the original scanning data with positioning information 8004 until the driving software receives the stop signal from the device, and then starts the mouse function.

Since the scanning device can moves across the scanned media in 360 degrees, if the original scanning data 8004 is simply configured in their receiving order to restore the image, such image must be twisted, compressed or tensioned etc. In order to correct such distortions, we need data of the terminal coordinates of each line of image to reconfigure an image line. Image configure is carried out in two modes, the first is to configure while receiving data, the second is to configure after ending scanning.

The first mode has its advantages of improving parallel computing, sufficiently using the time-share operating system, and minishing the post-processing time. But in such mode, it is impossible to know how big the image finally is in the scanning process, so it is necessary to dynamically allocate resource to store the configuring image being configured, which makes the software more complex. The second mode has its advantages of computing how big the object image is and its integral gradient before configuring the images, thus it is possible to allocate sufficient resource to configure image and make the software simpler. But such mode has the disadvantage of insufficiently using resource of the time-sharing system and elongating post-processing time.

Figure 8:
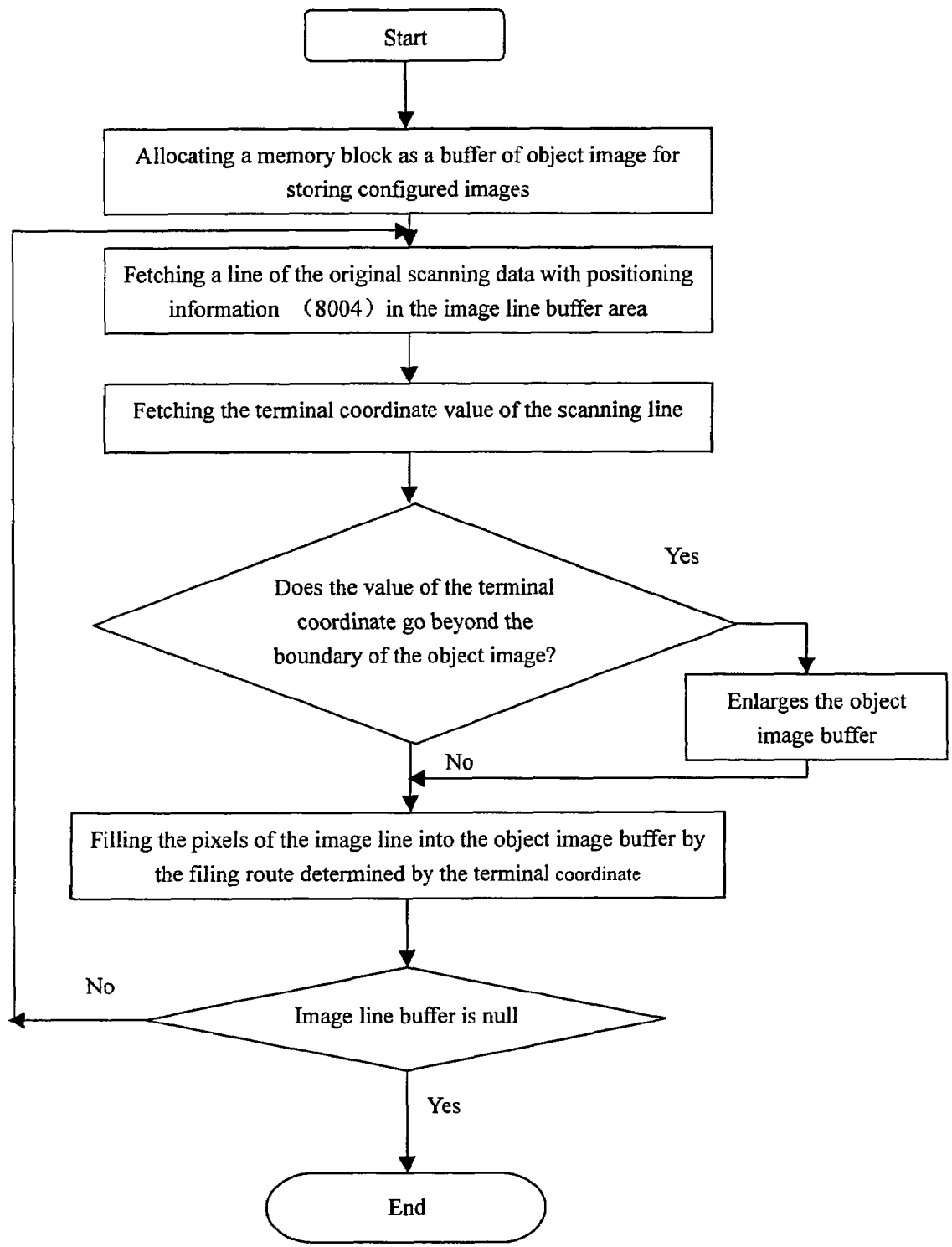
FIG. 8 illustrates an image-configuring flow chart at the same time of scanning in accordance with one embodiment of the present invention.

The flow chart illustrates the process of configuring the image to be scanned while scanning as shown in FIG. 8. Firstly, allocating a memory block as an object image buffer to store configured image. Each pixel of the image to be scanned corresponds to a memory unit of the object image buffer. After each pixel of the image to be scanned is stored into the corresponding area of the object image buffer, then the image is finished configuring, as shown in FIG. 10; secondly, fetching a line of data in the image line buffer storing the original scanning data 8004; then computing, and getting the terminal coordinate of the scanning line; if the terminal coordinate value is beyond the boundary of the object image buffer, then enlarging the object image buffer;

filing pixels of image line into the object image buffer by a filing route determined by the terminal coordinate; repeating the above-described steps until the image line buffer is null.

Figure 9:
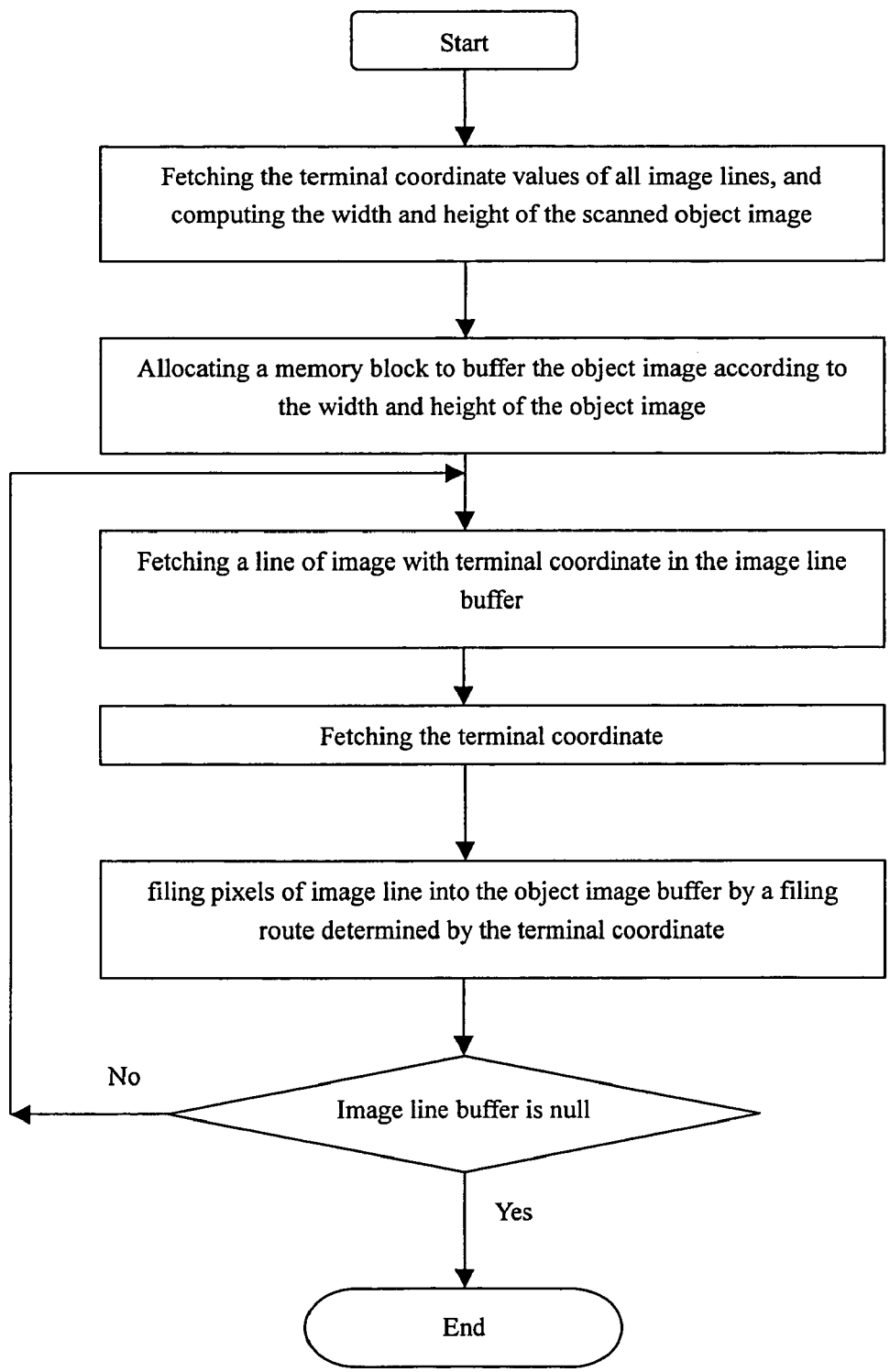
FIG. 9 illustrates an image-configuring flow chart after scanning in accordance with one embodiment of the present invention.

The configuring flow chart after ending scanning of the scanning device of the present invention is as shown in FIG. 9. Firstly computing and fetching all terminal coordinate values of the original scanning data with positioning information 8004, and computing the width and height of the object image to be scanned; allocating a memory block to store the object image according to the width and height of the object image; fetching a line of the original scanning data with positioning information 8004 in the image line buffer; filing pixels of image line into the object image buffer by a filing route determined by the terminal coordinate; repeating the above-described steps until the image line buffer is null.

Figure 10:
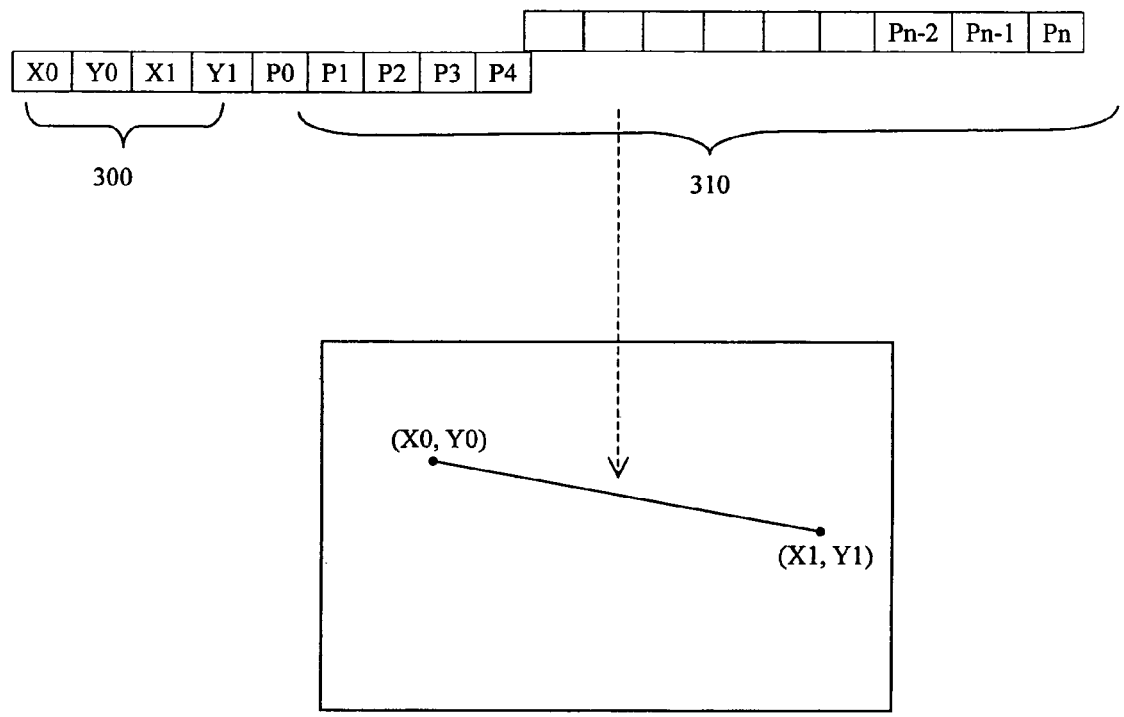
FIG. 10 illustrates a flow chart of configuring original scanning data 8004.

The configuring of pixel values of the original scanning data 8004 is shown in FIG. 10. Firstly, fetching the terminal coordinate value 300 of the original scanning data 8004, and then filing pixel value 310 into the object buffer.

Figure 11:
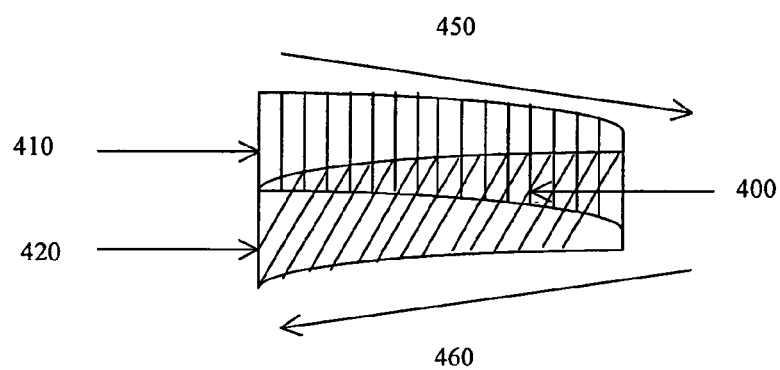
FIG. 11 is a schematic diagram illustrating an overlapped scanning band.

In order to guarantee no blank between the scanned images, and to successfully identify the positioning information of the scanned data, the scanning device are moved zigzag across the image to be scanned when scanning, as shown in FIG. 11, the scanning device starts in the 450 direction and generates the first scanning band 410, and then turns back in the 460 direction and generates the second scanning band 420. The two neighboring scanning bands 410 and 420 have to have sufficient overlapped area 400. But as the semaphore outputted by the coordinate sensors are integers, so there exists errors. And the longer the scanning track is, the bigger the accumulating error is, resulting in that the overlapped area 400 have different coordinates in the two scanning bands. If the image of the overlapped area 400 is from the first scanning band 410, then the lower boundary of overlapped area of the configured image will have a distinct fault. Also if the image of the overlapped area 400 is from the second scanning band 410, then the upper boundary of overlapped area of the configured image will have a distinct fault too. Relative positions of the image blocks have to be corrected in order to solve such problem.

Firstly fetching respectively part of pixel data in the overlapped area 400 between the first scanning band 410 and the second scanning band 420, then computing the coordinate offset which pixels in the overlapped area of the second scanning band 420 is relative to pixels in the overlapped area of the first scanning band 410, finally moving all images in the second scanning band 420 by the offset where configuring pixels of the overlapped area 400 are from the second scanning band 420. Relative offset between the two pixel blocks is computed according to the following methods:

1. To define numbers of pixels with the biggest horizontal offset and vertical offset based on experiential value;
2. To define the first pixel block as a referenced pixel block, the second pixel block as a pixel block requiring to be offset;
3. To compute unbiased variance of corresponding coordinate pixel values between two pixel blocks occurring a possible pixel value (including 0 offset);
4. The offset corresponding to the smallest unbiased variance is the best.

Choosing the late scanned pixel data in the overlapped area of said second scanning band to be used for configuring images, and moving all scanned pixel data before choosing by the best offset; or choosing the early scanned pixel data in the overlapped area of said second scanning band to be used for configuring images, and moving all scanned pixel data after choosing by the best offset.

In order to make the third step simply, the unbiased variance may be substituted by mean deviation.

Figure 12:
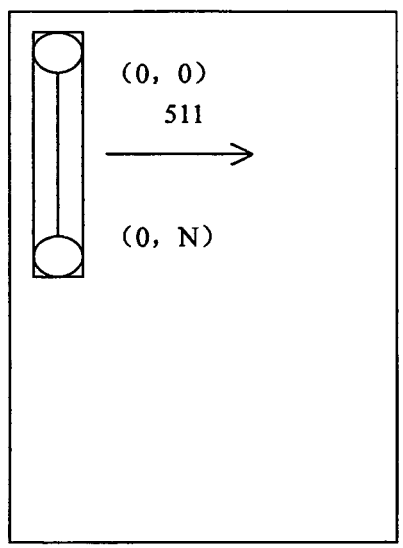
FIG. 12 is a schematic diagram illustrating line scanning mode and row scanning mode.
Figure 12:
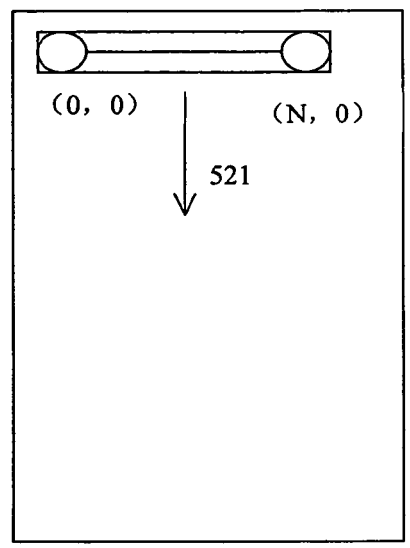

After the scanning is started, the terminal coordinates of the first line of image are fixed, and users may choose to start the line-scanning mode 510 or the row-scanning mode 520, as shown in FIG. 12. In the line-scanning mode, the terminal coordinates are initialized as [(0, 0), (0, N)], and the scanning device moves in the line-scanning direction 511; In the row-scanning mode 520, the terminal coordinates are initialized as [(0, 0), (N, 0)], and the scanning device moves in the line-scanning direction 521.

Figure 13:
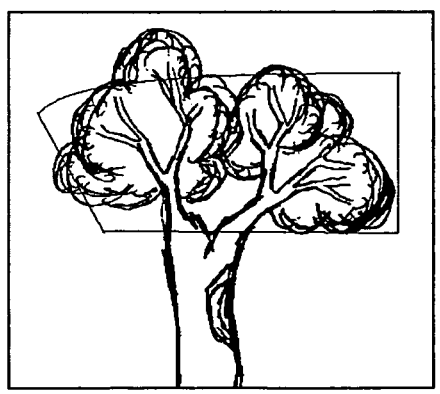
FIG. 13 is a schematic diagram illustrating images necessary to be revolved in accordance with one embodiment of the present invention.
Figure 13:
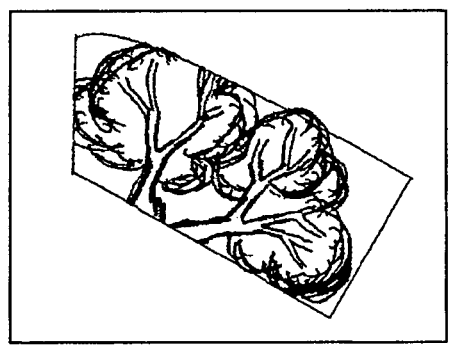

Since expect for the fist line of images, the terminal coordinates of each line of images are computed by adding the real-time displacement coordinate increments 8001, 8002 estimated by the first optical coordinate sensor and the first displacement processor P1 and the second optical coordinate sensor and the second displacement processor P2 based on a former image line. So no matter how vertical or straight the scanning track is in the post-scanning process, if the device is initially not placed vertical or straight, the configured image will be oblique, as shown in FIG. 13. As a result, the images require revolving.

In order to solve such problem, the gradients α i of each line of images are computed before configuring images based on terminal coordinates of each line of images. Since the direction of most scanning lines in the scanning process is the same or close to the direction which users move the device to scan, it is possible to estimate the integral gradient α=Σαi/N of the configured images, wherein N is the total number of the scanning lines. In the line-scanning mode, α i is defined as a tan((X1i−X0i)/(Y1i−Y0i)); in the row-scanning mode, α i is defined as a tan((Y1i−Y0i)/(X1i−X0i)). Wherein (X0i, Y0i) and (X1i, Y1i) are the terminal coordinates of the scanning image line. The software may revolve the whole image by −α degree after configuring, thus correcting the integral gradient of the image.

It is possible to set the scanning device of the present invention in the mouse state by default, and the device switches to the image scanning state by the scanning button being pressed, meanwhile sends out a signal to inform the upper machine to drive the software to start to receive scanning data. And when the scanning button is pressed again, the device send out a signal to inform the upper machine to end scanning, meanwhile switches back to the mouse state.

Signal volume outputted by either of the two coordinate sensors may be used to generate a mouse signal, while the other one may be off in order to save electricity. Generally neither of the two coordinate sensors is placed in the center of the device (sensor of a traditional mouse is placed in the center of the device), so users may not get used to the device because of different matter from the traditional mouse. In order to overcome such shortcoming, it is possible to have two coordinate sensors work together, and generate a mouse signal by integrating signal volumes of the two according to certain arithmetic, where the simplest arithmetic is the average of the two signal volumes. Specific working mode may be controlled by hardware or software switch. When the device is in the mouse state, the system processor P3 integrates the signal volumes of the coordinate sensors after receiving and sends out a mouse signal; when the device is in the image-scanning state, the system processor P3 is used to record the moving track of the two coordinate sensors, samples image, packets data and transmits data etc.

The image-processing module of the upper machine has such software functions as follows:

1. To perform drive function of a mouse;
2. To receive the original scanning data with positioning information 8004 from the device;
3. To correct the level of pixel brightness, including correction of picture black, picture white and time of exposure;
4. To realize configure, join and rotation of images;
5. To realize scanning data transfer protocol, for example TWAIN protocol;
6. To realize automation start of an application software to open an image;
7. To provide an image user interface with alternation-type post processing functions, including rotating, clipping and defaulting functions etc.

Figure 14:
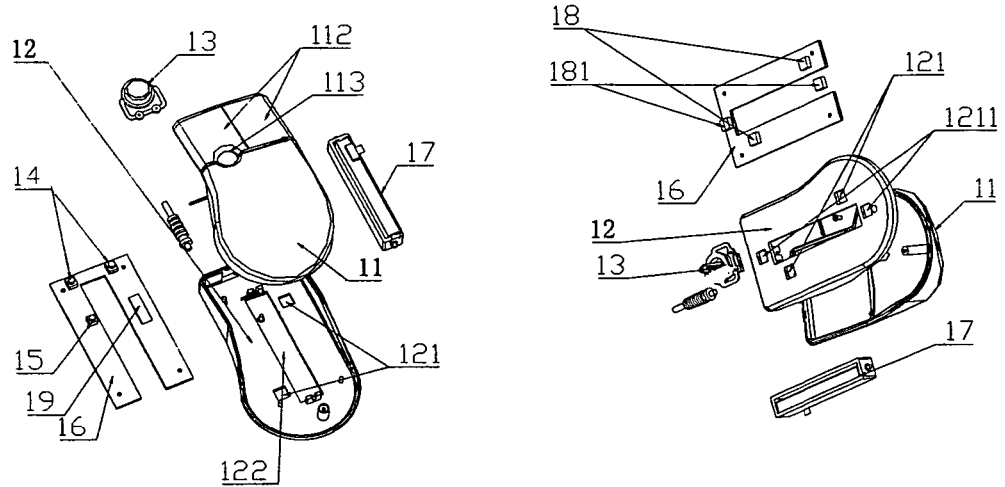
FIG. 14 is a schematic diagram illustrating a scanning device in accordance with one embodiment of the present invention.
Figure 15:
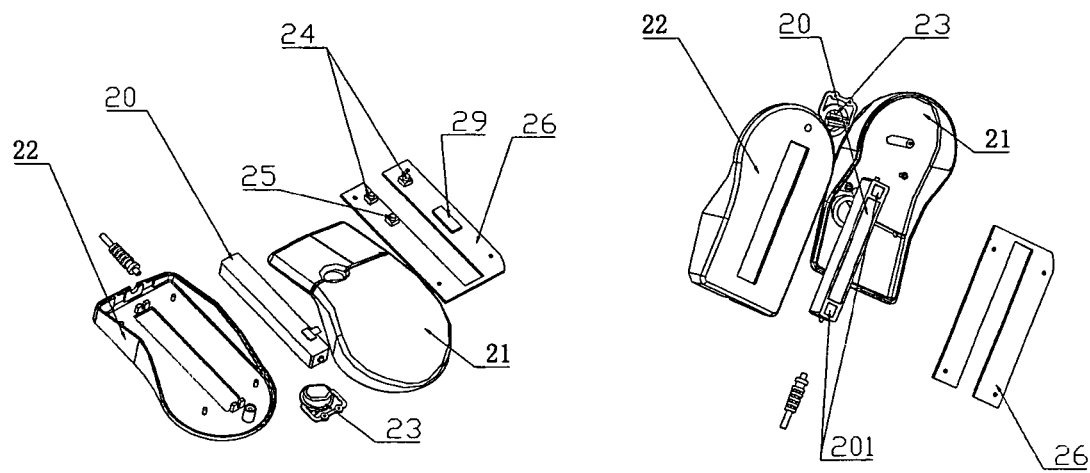
FIGS. 15, 16, 17, 18, 19, 20 are schematic diagrams illustrating a scanning device in accordance with one embodiment of the present invention.

One structure of the scanning device with two optical coordinate sensors and coordinate signal processors of the present invention are shown in FIG. 14, wherein including a upper casing 11, lower casing 12, CIS 17, circuit board and connecting line to the upper machine; a window 113 is located on the upper casing 11 for being equipped with a switch button which can switch a scanning function into a mouse function on the exposed button 13, mouse performing button 112 and button 14 for realizing mouse function of the upper casing; the circuit board is equipped with a switch button 15 for switching between scanning function and mouse function, signal control and disposal circuit 16, two optical coordinate sensors and coordinate signal processor 18, and a system processor 19; the lower casing 12 is equipped with a window 121 of the two optical coordinate sensors and coordinate signal processor 18 and window 122 of a CIS 17. The two optical coordinate sensors and coordinate signal processor 18 and the CIS 17 are fixed between the upper casing and the lower casing, and respectively scan permeating the window on the lower casing 12; the circuit board is fixed between the upper casing 11 and the lower casing 12. An embodiment in accordance with another structure of the present invention is shown in FIG. 15. In the embodiment, the optical displacement sensor and coordinate processors P1, P2 and the linear contact image sensor (CIS) are in a line and integrated in one module in structure; including a upper casing 21, a lower casing 22, a CIS 20 with two optical displacement sensors and coordinate signal processor 20, and a circuit board; the upper casing is equipped with a switch button 25 which switches between scanning function and mouse function on the exposed button 23 of the upper casing; the circuit board is equipped with two buttons and a switch 24 for realizing mouse function, a switch button 25 which switches between scanning function and mouse function, signal controlling and processing circuit 26 and a system processor 29 etc.

In another aspect of the scanning device of the present invention, the two optical coordinate sensors and coordinate signal processor 18 may be placed at two ends of the CIS 17, being in a line with the CIS 17, or be placed at any symmetrical positions centered by CIS scanning line's center, such as positions 18 and 181 as shown in FIG. 14. When two optical coordinate sensors and coordinate signal processor are fixed in a position like 181, the lower casing 12 corresponds to a window 1211.

Figures 17, 18:
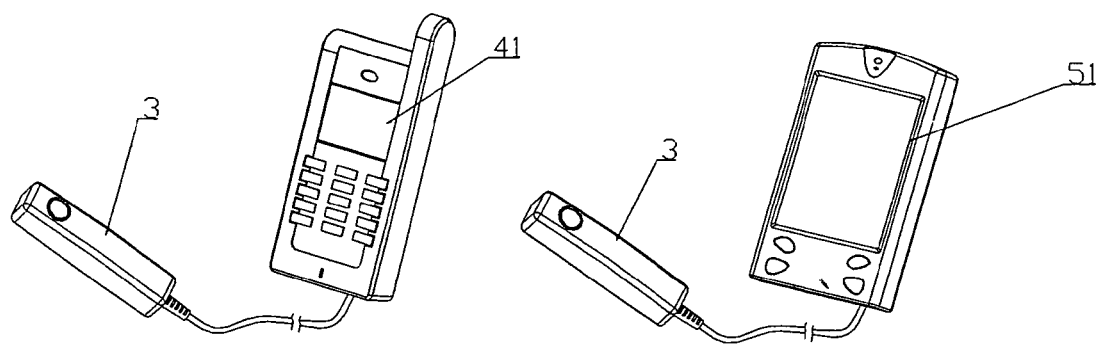

Two optical coordinate sensors and coordinate signal processor may be integrated with the CIS in one module group, or be placed separately with the CIS like 20 as shown in FIGS. 15 and 18, 181 as shown in FIG. 14.

The optical coordinate sensors and coordinate signal processor of the scanning device of the present invention are integrated in one chip.

Figure 16:
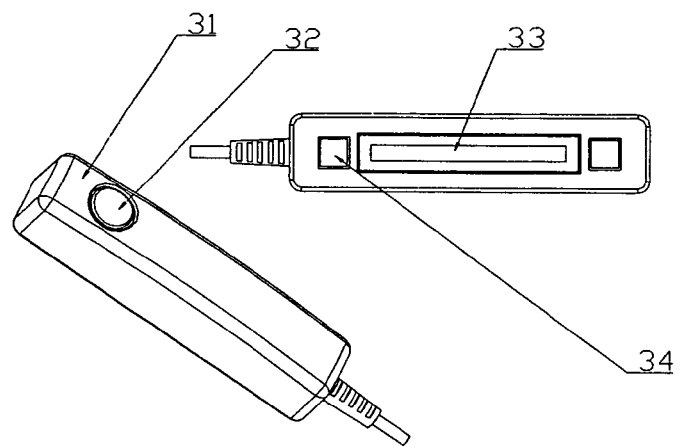

The scanning device of the present invention may also not serve as a mouse. Another embodiment of the present invention is shown in FIG. 16, wherein two optical coordinate sensors and coordinate signal processor 34 are placed at the two ends of the CIS 33 and are in a line with the CIS, integrated in one module group with the system processor P3, the scanning switch 32 is placed at the upper surface of the scanning device 31.

When used for scanning only, the optical scanning device of the present invention may be electrically connected to a computer or a PDA or a mobile phone. Data of scanned images are uploaded to the computer or PDA or mobile phone to be processed, as shown in FIG. 17 or FIG. 18. The optical scanning device 3 of the present invention is connected to the mobile phone 41, or to a PDA via an exterior cable.

Figures 19, 20:
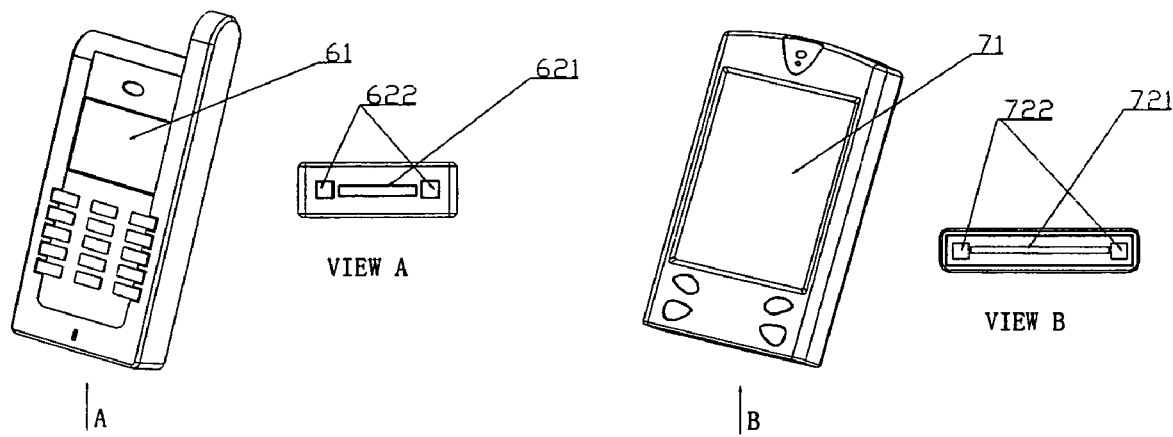

When used for scanning only, the optical scanning device of the present invention may be also integrated with a PDA or mobile phone, which may as one module imbedded in the PDA or mobile phone. Then the PDA and mobile phone may be used for scanning. As shown in FIG. 19 and FIG. 20; the bottom flank of the mobile phone 61 with scanning function is located with a CIS window 621 and a window 622 of the two optical coordinate sensors and coordinate signal processor; the bottom flank of the PDA 71 with scanning function is located with a CIS window 721 and a window 722 of the two optical coordinate sensors and coordinate signal processor.

Figure 21:
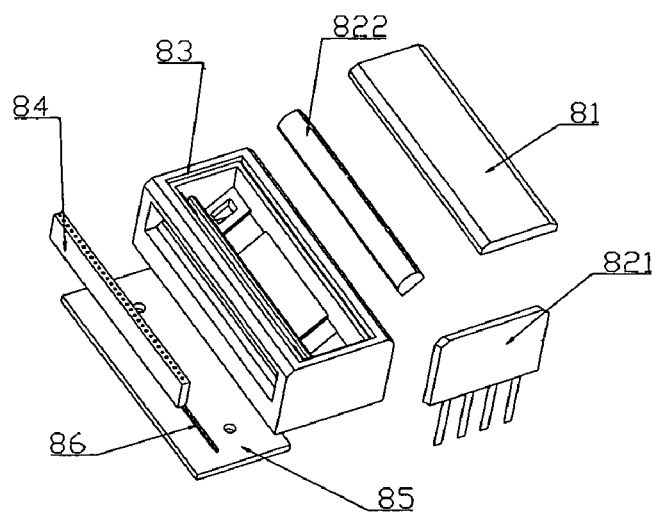
FIG. 21 is a schematic diagram illustrating a linear contact image sensor (CIS) of a scanning device in accordance with one embodiment of the present invention.

The structure of the linear contact image sensor (CIS) used by the optical scanning device of the present invention is as shown in FIG. 21, which includes glass 81, LED light source 821, light guide bar 822, shelf 83, self-focus lens 84, circuit board 85 and linear photosensor 86; all said components are fixed to said shelf 83; light which is emitted from said LED light source 821 transmits through said light guide bar 822, and then equably illuminates scanned images, the reflected light by the scanned images permeates said glass 81 and focuses on said linear photosensor 86 located on said circuit board 85 via focus lens 84; The structure as shown in FIG. 21 is very compact and rational, and may be used in various embodiments in accordance with the scanning device of the present invention.

Figure 22:
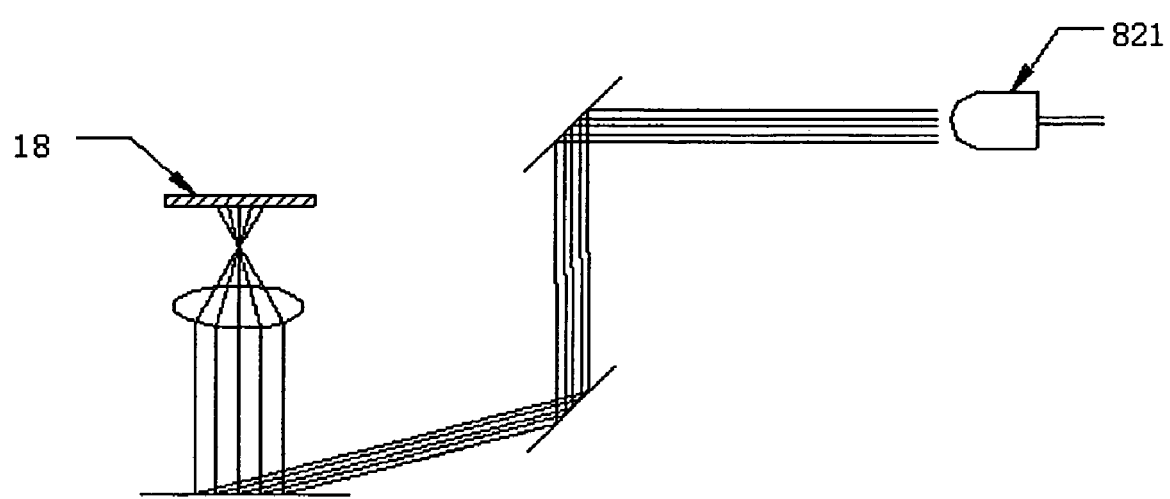
FIG. 22 is an optical view of an optical coordinate sensor of the scanning device in accordance with one embodiment of the present invention.

Two optical coordinate sensors and coordinate signal processor 18 are applied with optical displacement sensor of an existing photoelectrical mouse, optical route of which is shown in FIG. 22.

The invention claimed is:

1. A scanning device with a positioning sensor, which connected to a computer device, said scanning device comprising:
   a casing;
   a linear contact image sensor (CIS), having a signal output;
   a system processor controls said CIS by a timing signal;
   a first optical coordinate sensor displacement processor for estimating a first coordinate increment of a real-time displacement of said scanning device;
   a second optical coordinate sensor and displacement processor for estimating a second coordinate increment of the real-time displacement of said scanning device;
   an A/D circuit configured to receive the signal output of said CIS, the A/D circuit further configured to output digital image data;

a data buffer for storing the first and second coordinate increments and digital image data outputted by the A/D circuit; and wherein said system processor is further configured to packets said first and second displacement coordinate increments stored in said data buffer and the digital image scanning data outputted through said A/D circuit by said linear contact image sensor (CIS), as original scanning data with positioning information, said system processor further configured to transfer the original scanning data with positioning information to the computer device.

2. The scanning device with a positioning sensor as claimed in claim 1, wherein the system processor is further configured to determine whether either of the displacement coordinate increments is non zero, and if either of the displacement coordinate increments is non zero, to transmit a line scanning start signal together with a clock signal for image sampling and a light control signal to said linear contact image sensor (CIS) to control data sampling carried out by said linear contact image sensor (CIS).

3. The scanning device with a positioning sensor as claimed in claim 2, wherein an exposure time of scanning data in each line analog image sampled by said linear contact image sensor (CIS) by line is of fixed duration, based at least in part on the displacement coordinate increments.

4. The scanning device with a positioning sensor as claimed in claim 1, wherein power supply is provided by the computer device which comprises at least one of: a computer, mobile phone or PDA.

5. The scanning device with a positioning sensor as claimed in claim 1, wherein said first optical coordinate sensor and displacement processor, and said second optical coordinate sensor and displacement processor are separate chips.

6. The scanning device with a positioning sensor as claimed in claim 3, wherein said linear contact image sensor (CIS) comprises:
    glass located at a scanning window;
    a LED light source;
    a light guide bar;
    a shelf;
    a self-focusing lens;
    a circuit board; and
    a linear photosensor;
    wherein all of said scanning window, LED light source, light guide bar, self-focusing lens, circuit board and linear photosensor are fixed to said shelf, and wherein light which is emitted from said LED light source transmits through said light guide bar and permeates said glass, equably illuminating images to be scanned, wherein light reflected by the scanned images permeates said glass and focuses on said linear photosensor located on said circuit board via said self-focusing lens; said linear photosensor configured to convert light signal into scanning signal of analog image and to transfer the scanning image to said A/D circuit via said circuit board.

7. The scanning device with a positioning sensor as claimed in claim 6, wherein two ends of the shelf of said linear contact image sensor (CIS) are respectively fixed to said first and second optical coordinate sensors and chips of the first and second displacement processors; and wherein said first and second optical coordinate sensors and chips of the first and second displacement processors are integrated in one module group and in a line with a scan line.

8. The scanning device with a positioning sensor as claimed in claim 6, wherein two ends of the shelf of said linear contact image sensor (CIS) are respectively fixed to said first and second optical coordinate sensors and chips of the first and second displacement processors; and wherein said first and second optical coordinate sensors and chips of the first and second displacement processors are integrated in one module group and form a quadrangle with the terminals of the scanning line.

9. The scanning device with a positioning sensor as claimed in claim 6, wherein said casing comprises an upper casing and a lower casing, and wherein the scanning device further comprises a system circuit board fixed between the upper casing and the lower casing, wherein a first window is located on said upper casing with an exposed button of a switch for switching between scanning function and mouse function and with a button switch for performing mouse function; wherein a second window of said first and second optical coordinate sensors and the first and second displacement processors and a third window of said linear contact image sensor (CIS) are located on the lower casing, such that the center of said second window and the terminals of the scanning line of said third window are in a line or form a quadrangle.

10. The scanning device with a positioning sensor as claimed in claim 7 or 8, wherein said system processor, said A/D Circuit, said data buffer, and said data-transferring interface circuit connected to the computer device are located on said circuit board.

11. The scanning device with a positioning sensor as claimed in claim 7 or 8, wherein the scanning device is embedded on a casing of said computer device, and wherein said system processor is a main CPU of said computer device.

12. A processing method for a scanning device with a positioning sensor to obtain images, said processing method comprising:
    (a) providing a first optical coordinate sensor and a first displacement processor that estimate out a first real-time displacement coordinate increment and a second optical coordinate sensor, further providing a second displacement processor that estimates out a second real-time displacement coordinate increment, and further providing a system processor that is configured to packet said first and second displacement coordinate increments and digital image scanning data outputted through an A/D circuit by a linear contact image sensor (CIS) into original scanning data with positioning information, said system processor further configured to transfer the original scanning data with positioning information to computing device;
    (b) de-packeting said original scanning date using an image processing module in the computing device;
    (c) converting out coordinates of a terminal pixel of said linear contact image sensor (CIS) using said image processing module, and configuring image lines in an object image configuring area making use of the coordinates of the terminal pixel; and
    (d) calculating a relative offset of the positioning coordinate of two scanning bands making use of statistical characteristics of at least a part of pixel data in an overlapped area of the two scanning bands, and rectifying the relative offset and configuring image lines.

13. The processing method as claimed in claim 12, wherein (a) further comprises:
  checking whether at least one of the first displacement coordinate increment and the second displacement coordinate increment is non zero; and
  if so, triggering the CIS to generate said digital image scanning data.

14. The processing method as claimed in claim 12, wherein (c) further comprises:
  (c11) allocating a memory block as a buffer of object image for storing configured images;
  (c12) fetching a line of the original scanning data with positioning information in an image line buffer area;
  (c13) computing and fetching the terminal coordinate value of a scanning line;
  (c14) if the value of the terminal coordinate goes beyond a boundary of an object image buffer, then enlarging the object image buffer; and
  (c15) filling the pixels of the image line into the object image buffer by a filling route determined by the terminal coordinate.

15. The processing method as claimed in claim 12, wherein (c) further comprises:
  (c21) computing and fetching the terminal coordinate values of all original scanning data with positioning information, and computing a width and height of the scanned object image;
  (c22) allocating a memory block to buffer the object image according to the width and height of the object image; and
  (c23) filling the pixels of the image line into the object image buffer by the filing route determined by the terminal coordinate.

16. The processing method as claimed in claim 14 or claim 15, wherein in (c) further comprises computing a gradient of the coordinate of each line of original scanning data using the coordinate information of said terminal pixels, after configuring the image in (d), and rotating the configured image according to an average gradient of the coordinate of all original scanning data.

17. The processing method as claimed in claim 14 or claim 15, wherein (d) further includes:
  (d11) setting possible pixel values of horizontal or vertical offset;
  (d12) fetching at least a portion of pixel data in the overlapped area of the two scanning bands, and computing an unbiased variance of corresponding coordinate pixel values between two pixel blocks occurring a possible pixel value;
  (d13) choosing an offset corresponding to a smallest unbiased variance as a best offset; and
  (d14) choosing a late scanned pixel data in the overlapped area of said two scanning bands to be used for configuring images, and moving all scanned pixel data before choosing by the best offset; or choosing the early scanned pixel data in the overlapped area of said two scanning bands to be used for configuring images, and moving all scanned pixel data after choosing by the best offset.

18. The processing method as claimed in claim 17, wherein in (d12), the unbiased variance is substituted by a mean deviation.

19. The processing method as claimed in claim 16, wherein:
  in the line scanning mode, the gradient of the coordinate of each line i of original scanning data is represented as $\alpha_i = a\tan((X1_i - X0_i)/(Y1_i - Y0_i))$;
  in the row scanning mode the gradient of the coordinate of each line i of original scanning data is represented as $\alpha_i = a\tan((Y1_i - Y0_i)/(X1_i - X0_i))$;
  wherein $(X0_i, Y0_i)$ and $(X1_i, Y1_i)$ are the line terminal coordinates of the scanned images respectively; and
  wherein the processing method further comprises rotating the whole configured image by $-\alpha$ degree, wherein the sum of the scanning line is $\alpha = \Sigma \alpha_i / N$.

* * * * *